Oct. 7, 1924.   1,510,986
R. B. FAGEOL
COMBINED BUMPER AND RADIATOR SHIELD
Filed Nov. 7, 1923
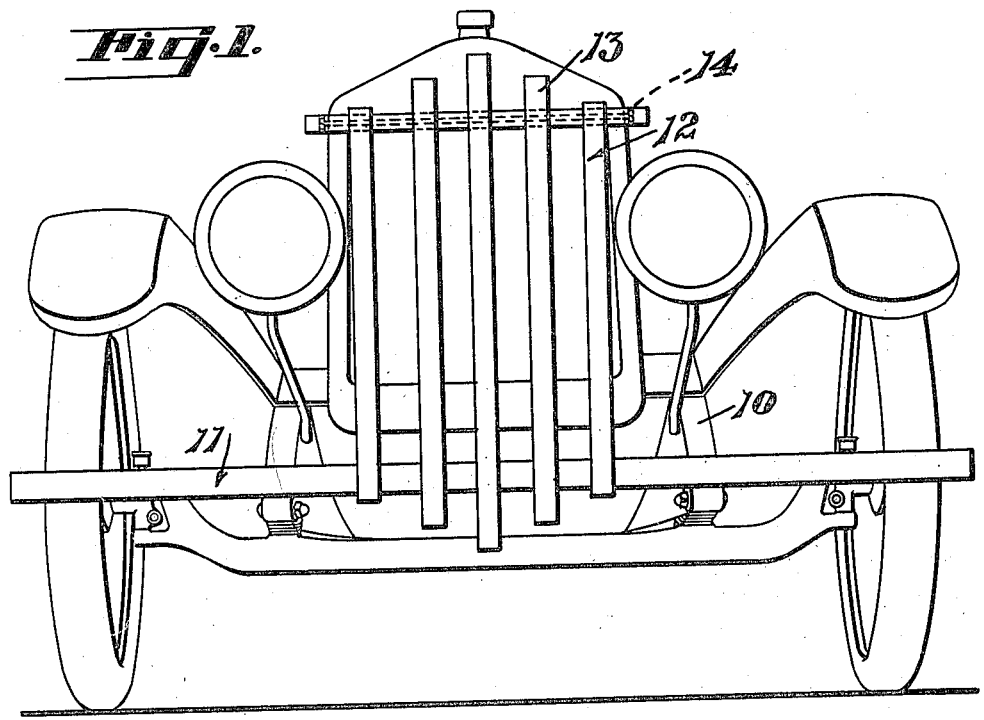
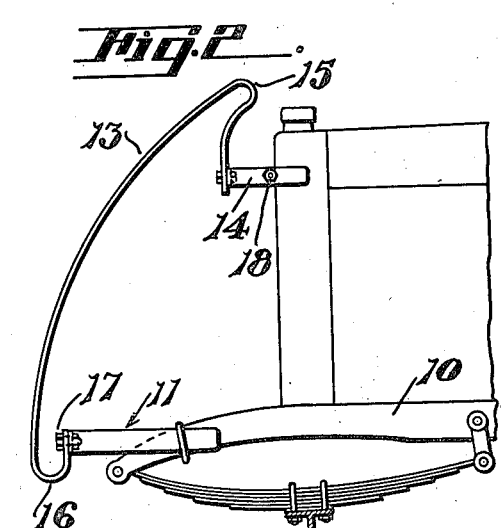
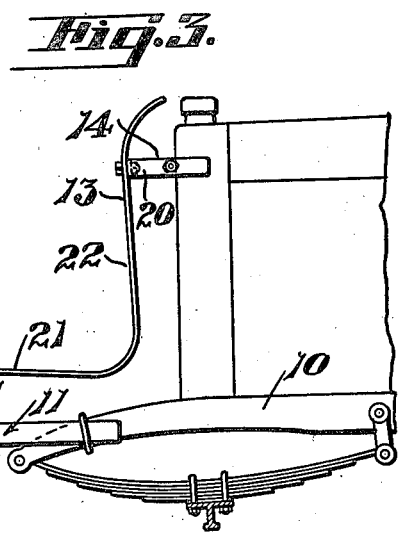
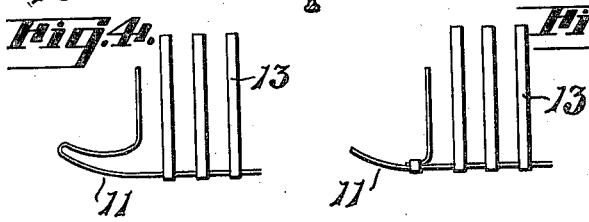
INVENTOR.
ROLLIE B. FAGEOL.
BY
ATTORNEYS.

Patented Oct. 7, 1924.

1,510,986

UNITED STATES PATENT OFFICE.

ROLLIE B. FAGEOL, OF LOS ANGELES, CALIFORNIA.

COMBINED BUMPER AND RADIATOR SHIELD.

Application filed November 7, 1923. Serial No. 673,269.

*To all whom it may concern:*

Be it known that I, ROLLIE B. FAGEOL, a citizen of the United States, residing at Los Angeles, county of Los Angeles, and State of California, have invented new and useful Improvements in Combined Bumpers and Radiator Shields, of which the following is a specification.

This invention relates to a combined bumper and radiator shield for automobiles.

It is the principal object of the present invention to provide a suitable protective structure for the radiator and fenders of an automobile, which structure will stand in a position to shield these parts of the vehicle from danger in the event of collision, and at the same time to absorb the impact shock thus arising so that a minimum amount of damage will be done to the parts of the car shielded by the structure.

The present invention preferably contemplates the use of a bumper of the spring bar type to which are secured a plurality of radiator protecting members which obtain a desired amount of resiliency from the spring bar bumper on which they are mounted and obtain additional resiliency due to the manner in which they are secured by their upper ends to the radiator.

The invention is illustrated by way of example in the accompanying drawings, in which:

Fig. 1 is a view in front elevation showing one form of the present invention as applied to an automobile.

Fig. 2 is a view in vertical section through the automobile bumper disclosing one manner in which the radiator protecting members may be formed.

Fig. 3 is a view in vertical section through a bumper showing another form of the invention whereby the structure may also be used as a luggage rack or tire support.

Fig. 4 is a fragmentary view in plan showing the invention as embodying the use of a loop end spring bar bumper.

Fig. 5 is a fragmentary view in plan showing the invention embodying the use of a free end bumper.

Referring more particularly to the drawings, 10 indicates the side frame members of an automobile vehicle main frame. The forward terminating ends or horns of these frame members are here shown as fitted with an automobile bumper 11. It will be understood that this bumper may be of any type, but that it is preferable to construct it along the lines of the loop end spring bar bumper as indicated in Fig. 4 of the drawing, or the free end spring bar bumper as indicated in Fig. 5 of the drawing. In any event the bumper extends transversely of the vehicle frame with its outer ends assuming a protecting position in front of the vehicle fenders. The bumper will thus act in the usual manner to protect the forward portion of the vehicle and frame in case of collision.

An additional device is incorporated in the present structure which comprises a radiator shield 12. This shield is preferably formed of a plurality of bars 13 which are secured by their lower ends to the transversely extending vehicle bumper 11 and by their upper ends to a transverse fastening bar 14. It is preferable that these bars be flat in order to obtain the greatest shock absorption from them when pressure is brought to bear against their front faces. The bars are spaced close enough together to adequately protect the radiator from most objects which might damage the radiator at the time of collision.

In the form of invention shown in Fig. 2 the bars are arcuate in formation for a larger portion of their length and terminate in looped ends 15 and 16. The loop 16 may project slightly above the top of the radiator while the loop 17 occurs adjacent the bumper bar 11 to which the lower terminating ends of the members 13 are fastened. This may be accomplished by rivets or bolts as indicated at 17. The upper terminating ends of the radiator shield bars 13 are recurved to form the loops 15 and then extend downwardly to be fastened to a transversely positioned clamping bar 14. This bar may be of any design, although it is here shown as having ends extending rearwardly along the opposite sides of the radiator shell and being clamped against the shell by a bolt 18 extending across the front of the radiator for this purpose. With the radiator shield thus constructed it will be seen that a convex surface will be formed to ward off any blows which might otherwise reach the radiator core and that furthermore the body striking the shell will be retarded in its movement and the force of its impact to a great extent absorbed due to the yielding action of the loop end bars 13, and when the bumper 11 is a spring bar bumper to the yielding action of the bumper.

In the form of the invention shown in Fig. 3 the shield bars 13 are of different design, the lower ends of the bars being fastened to the bumper 11 and terminating in loops 16 while the upper end of the bars terminate in rearwardly curved ends 19. A horizontal mounting for the upper end of the bars is provided by forming loops 20 at the ends of the transverse supporting bar 14. These loops are substantially the same as the loops 16 shown in Fig. 2 of the drawing. The shield bars 13 have horizontally extending portions 21 which may serve as a grating on which luggage may be mounted while the vertical portions 22 will act as a radiator shield.

In operation of the present invention a suitable bumper bar is mounted transversely of a vehicle frame and secured thereto. To this bar are attached a plurality of shield bars 13 which extend upwardly and are secured by their upper ends to the transverse fastening bar 14 which in turn is clamped to the shell of the radiator. In the event that the front of the vehicle comes into collision with a fixed or moving object the bumper and radiator shield will be interposed between the vehicle and the object with which it collides. Any portion of this object which would tend to strike the fenders would be warded off by the bumper, and in the event that any overhanging portion is in danger of damaging the radiator, this would be warded off by the radiator shield bars 13. The force of impact would be absorbed due to the resiliency of the shield bars 13, and their formations, and the resilient mounting afforded by the bars 14 and the bumper 11.

It will thus be seen that the present invention affords adequate means for protecting the complete forward end of an automobile and insuring that in the case of impact or collision a vehicle will be shielded and the major portion of the force directed against the vehicle will be absorbed by the yielding action of the bumper and the shield.

While I have shown the preferred form of my invention as now known to me, it will be understood that various changes might be made in the combination, construction and arrangement of parts by those skilled in the art, without departing from the spirit of the invention as claimed.

Having thus described my invention what I claim and desire to secure by Letters Patent is:

1. A protective device for vehicles comprising a bumper extending transversely of the vehicle and resiliently supported thereby and carrying a shield for the protection of the vehicle radiator, said shield being resiliently secured in position.

2. A protective device for vehicles comprising a bumper extending transversely of the vehicle frame and resiliently supported thereby, a shield supported at its lower ends by the bumper and extending upwardly in a protecting position in front of the automobile radiator, and means for yieldingly securing the upper portion of the shield to the radiator.

3. A protective device for automobiles comprising a resiliently mounted bumper disposed transversely of a vehicle frame, a radiator shield secured by its lower end to the bumper and extending upwardly in a protecting position in front of the radiator, and means for securing the upper end of the shield to the radiator shell.

4. A protective device for automobiles comprising a resilient bumper extending transversely of the automobile frame, a radiator shield secured by its lower end to the said bumper, and resilient means for securing the upper end of said shield to a radiator.

5. A protective device for automobiles comprising a bumper secured transversely of the automobile frame, attaching means secured transversely of the radiator, and a resilient shield secured by its lower end to the bumper and by its upper end to the attaching means, said shield comprising a plurality of resilient strips extending parallel to each other.

6. A protective device for automobiles comprising a bumper secured transversely of the automobile frame, attaching means secured transversely of the radiator, and a resilient shield secured by its lower end to the bumper and by its upper end to the attaching means, said shield comprising a plurality of flat resilient strips extending parallel to each other and in a protecting position in front of the radiator core.

7. A protective device for automobiles comprising a bumper secured transversely of the automobile frame, attaching means secured transversely of the radiator, and a resilient shield secured by its lower end to the bumper and by its upper end to the attaching means, said shield comprising a plurality of flat resilient strips extending parallel to each other and in a protecting position in front of the radiator core, the strips being formed at their opposite ends with loops by which they are secured to the bumper and the attaching means.

8. A protective device for radiators comprising a spring bar bumper extending transversely of a radiator frame, a transversely extending attaching member secured to the radiator shell, and a plurality of spring bars secured by their opposite ends to the radiator and the attaching means and disposed in spaced parallel relation to each other for the protection of the radiator core.

9. A protective device for radiators comprising a spring bar bumper extending transversely of a radiator frame, a transversely extending attaching member secured to the radiator shell, and a plurality of spring bars secured by their opposite ends to the radiator and the attaching means and disposed in spaced parallel relation to each other for the protection of the radiator core, said bars having looped ends by which they are fastened to the attaching means.

ROLLIE B. FAGEOL.